United States Patent Office 3,808,249
Patented Apr. 30, 1974

3,808,249
FLUOROALIPHATICTHIOMETHYLSILANES
Robert J. Koshar, Mahtomedi, Minn., assignor to Minnesota Mining and Manufacturing Company, St. Paul, Minn.
No Drawing. Filed Apr. 2, 1973, Ser. No. 346,993
Int. Cl. C07f 7/08, 7/18
U.S. Cl. 260—448.2 N          16 Claims

ABSTRACT OF THE DISCLOSURE

Organosilanes of the formula

are provided. These silanes are useful as surface treating agents, solvents, release agents, surface active agents and the like and as precursors to solvent resistant organosiloxanes useful as release liners, gaskets, protective coatings, high temperature lubricants, electrical insulation and molded products. $R_f$ is a highly fluorinated monovalent fluoroaliphatic radical having 1 to 18 carbon atoms.

---

This invention relates to organosilanes and to their preparation. More particularly, this invention relates to fluoroaliphaticthiomethylsilanes and their preparation.

Organosilanes are well-known compounds that have been used in many different fields. They may be conveniently classified as non-hydrolyzable or hydrolyzable organosilanes according to whether they either lack or possess a hydrolyzable group. Those organosilanes that lack hydrolyzable groups are comparatively inert compounds of generally low molecular weight that have found use as solvents, lubricants, release agents, surface active agents, etc. The hydrolyzable organosilanes, however, are generally used as surface treating agents or to prepare organosiloxanes of low to very high molecular weights. The organosiloxanes have found acceptance as release liners, gaskets, protective coatings, high temperature lubricants, electrical insulation, etc. The good mechanical properties of the organosiloxanes, especially those having a high molecular weight make them suitable for molded products having a variety of uses. The organosiloxanes, e.g., those having methyl or phenyl groups attached to the silicon atom, however, have been found, in general, to offer little resistance to many hydrocarbon fluids which are solvents for the organosiloxanes or cause swelling of cured siloxane polymer.

Attempts have been made to improve the solvent resistance of organosiloxanes by preparing them from hydrolyzable organosilanes having fluorine atoms on some of the substituent groups of the silicon atom. One such attempt is described in U.S. Pat. No. 3,122,521. Here organosilanes having a perfluoroalkyl group have been prepared and used to prepare organosiloxanes having units in its polymer chain of the structure:

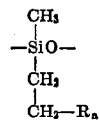

wherein $R_a$ is a perfluoroalkyl group such as $CF_3$. These organosiloxanes are disclosed as exhibiting increased solvent resistance which enables them to be used in some hydrocarbon solvent environments. Although these organosiloxanes are an improvement in some aspects over many conventional organosiloxanes, further improvement in solvent resistance to certain solvents, heat stability at elevated temperatures, and low temperature flexibility are desirable for many uses. Further improvement in hydrolytic and thermal stability is also needed since it has been shown (cf. O. R. Pierce and Y. K. Kim, Rubber Chemistry and Technology, 44 (5), 1350 (1971)) that fluorosilicon compounds having, for example, $CF_3CH_2$— or $CF_3$— groups attached directly to silicon atoms exhibit hydrolytic instability and readily undergo thermal decomposition.

Since the conventional organosilanes that lack hydrolyzable groups exhibit many of the undesirable characteristics of the conventional organosiloxanes, it is desirable to provide organosilanes having improved characteristics.

One aspect of the present invention is to provide organosilanes having a fluoroaliphaticthiomethyl group.

Another aspect of this invention is to provide fluoroaliphaticthiomethylsilanes which do not possess hydrolyzable groups and are hydrolytically stable.

Another aspect of this invention is to provide fluoroaliphaticthiomethylsilanes which possess hydrolyzable groups and which may be hydrolyzed to fluoroaliphaticthiomethylsiloxanes having desirable characteristics such as solvent resistance, heat stability, and flexibility at low temperatures.

It is yet another aspect of this invention to provide a method for the introduction of fluoroaliphaticthiomethyl groups into organosilanes by direct substitution with fluoroaliphaticsulfenyl chlorides.

In accordance with this invention fluoroaliphaticthiomethylsilanes are provided having the generic formula

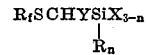

wherein $R_f$ is a highly fluorinated monovalent fluoroaliphatic radical having 1 to 18 carbon atoms; R is an organic group selected from methyl, ethyl and phenyl groups which may, of course, have inert substituents); Y is selected from hydrogen, chlorine, methyl, chloromethyl, phenyl, $R_fS$ and $R_fCH_2$; X is a hydrolyzable group; and $n$ is 0–3. For the preferred fluoroaliphaticthiomethylsilanes of the invention Y is H, X is chlorine and R is methyl. $R_f$ in groups $R_fS$ and $R_fCH_2$ is independently the same type of group as $R_f$ in the general formula. By the term hydrolyzable group is meant a group that reacts readily with water under basic, neutral or acidic conditions to provide a silanol group (OH) onto the silane. Such hydrolysis can occur under mild conditions such as room temperature.

In the practice of this invention, the term highly fluorinated monovalent fluoroaliphatic radical encompasses fluorinated, saturated, monovalent, aliphatic radicals having 1 to 18 carbon atoms. The skeletal chain of the radical may be straight, branched or, if sufficiently large, cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has the formula $$C_xF_{2x+1}$$

wherein $x$ has a value from 1 to 18.

Hydrolyzable fluoroaliphaticthiomethylsilanes of this invention are conveniently prepared by the free radical substitution reaction of fluoroaliphaticsulfenyl chlorides with methylsilanes as exemplified by the preparation of fluoroaliphaticthiomethylhalosilanes shown in Reaction I, wherein $R_f$, R and Y are defined above, $n=0-2$, X is chlorine, bromine or fluorine and the preferred X group is chlorine.

Reaction I

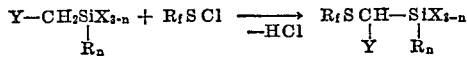

The inert substituents which may be used on group R are those substituents which are less reactive to the sulfenyl chloride than are the active Y—CH$_2$— groups attached to the silicon atom groups in the starting methylsilane. This is required because substituent groups more active than this will prevent the formation of the proper units within the silane molecule. Examples of such inertly substituted R groups are CH$_2$Cl, CH$_2$Br, CCl$_3$, CH$_2$CN, p-fluorophenyl, and p-trifluoromethylphenyl. Any substituent which is less reactive to the sulfenyl chloride than is the active substituent attached to the silicon atom, however, is tolerable in the practice of this invention.

The above reaction is carried out by photochemical methods such as by the use of high or low pressure quartz mercury vapor lamps or by decomposing free radical catalysts such as acetyl peroxide, benzoyl peroxide and the like or azo catalysts such as azobisisobutyronitrile. The temperature range is about —30 to 100° C. or higher depending on the type of initiation used and the temperature at which generation of free radicals from the catalyst occurs. Photochemical reactions are conveniently carried out at room temperature.

The reaction can be carried out in reaction vessels constructed of metal such as stainless steel, quartz or Pyrex under atmospheric, subatmospheric or superatmospheric pressure depending on the method and methylsilane used. Reactions with methylsilanes having hydrolyzable groups attached to silicon such as chlorine, fluorine and bromine are best carried out under essentially anhydrous conditions to avoid premature hydrolysis of the silane product.

Although the reactions can be carried out without solvent, solvents are preferred. Since the halogen atom attached to the silicon atom is very reactive and easily hydrolyzed, inert solvents and anhydrous conditions are employed. Suitable solvents are those which are generally used for known chlorination reactions and do not react with the sulfenyl chloride. Suitable solvents include chlorinated solvents, such as methylene chloride, chloroform, carbon tetrachloride and 1,1,2-trichlorotrifluoroethane; aromatic solvents such as benzene, chlorobenzene and benzotrifluoride; and inert nitriles such as acetonitrile. The mole ratio of the sulfenyl chloride to the methylsilane can vary considerably depending on the reactivity of the starting methylsilane. The mole ratio can be 0.1:1 or lower to about 10:1 or higher. Usually a ratio of between 1:1 and 1:3 is used. The fluoroaliphaticthiomethylsilanes can be isolated by distillation, crystallization or chromatography under anhydrous conditions.

Examples of methylhalosilanes which can be reacted with the sulfenyl chlorides to provide fluoroaliphaticthiomethylhalosilanes are: methyltrichlorosilane, dimethyldichlorosilane, trimethylchlorosilane, diphenylmethylchlorosilane, phenylmethyldichlorosilane, phenyldimethylchlorosilane, chloromethyldimethylchlorisilane, trichloromethyldimethylchlorosilane, bromomethyldimethylchlorosilane, cyanomethyldimethylchlorosilane, trimethylfluorosilane, trimethylbromosilane, dimethyldifluorosilane, dimethyldibromosilane, diethyldichlorosilane, 3,3,3-trifluoropropylenemethyldichlorosilane, 2 - chloroethyltrichlorosilane, benzyltrichlorosilane and 4 - chlorophenylmethyldichlorosilane.

In the general formula,

where $n$ is 3, these compounds are essentially stable, nonhydrolyzable solvents and lubricants for fluoropolymers such as the fluoroaliphaticthiomethylsiloxanes. These compounds are prepared under conditions similar to the conditions shown for Reaction I by reacting the sulfenyl chloride with methylsilanes of the general formula YCH$_2$SiR$_3$ where R and Y are defined above. Examples of starting methylsilanes are: tetramethylsilane, trimethylethylsilane, trimethylchloromethylsilane, tetraethylsilane, trimethylphenylsilane, dimethyldiphenylsilane and the like.

As disclosed above, the $R_f$ group is a monovalent saturated fluoroaliphatic radical which contains predominantly fluorine atoms bonded to carbon. The radical can contain hydrogen or chlorine atoms but usually not more than one for each carbon atom. The preferred radical is the perfluoroalkyl radical. The radical may be an open acyclic straight chain or branched-chain structure, or it may be a cycloaliphatic group of sufficient size to insure stability such as perfluorocyclohexyl, or it may consist of a hybrid combination such as perfluoro(2-cyclohexylethyl). The radical may include an oxygen atom linking two carbon atoms, e.g., —CF$_2$OCF$_2$—, or a nitrogen atom linking together three carbon atoms, e.g., (R$_f$CF$_2$)$_2$NCF$_2$—. Examples of the fluoroaliphatic radicals are perfluoromethyl, perfluoroheptyl, perfluorododecyl, perfluoroisopropyl, perfluoro(2-ethoxyethyl), perfluoro(cyclohexyl), perfluoro(2-cyclohexylethyl), chlorodifluoromethyl, 2,3-dichloroperfluoropropyl, omega-hydroperfluoroethyl and difluoromethyl. A preferred class of sulfonyl chlorides are those which have a —CF$_2$— group attached to the sulfur.

The starting sulfenyl chloride can be prepared by known methods such as described by E. Kober, J. Am. Chem. Soc., 81, 4810 (1959) and M. Hauptschein, U.S. Pat. 3,256,328. The starting silanes are generally commercially available.

The fluoroaliphaticthiomethylhalosilanes described above, especially where X in the general formula is chlorine, are useful for providing other hydrolyzable organosilanes of the invention by reactions of the fluoroaliphaticthiomethylhalosilane with alcohols, amines, carboxylic acid anhydrides and mercaptans under neutral or basic conditions such as the use of organic tertiary amines. The methods used are similar to those reported for reactions of known organohalosilanes. For example, see W. Noll, Chemistry and Technology of Silicones, 1968, pp. 78 and 81. Examples of hydrolyzable organosilanes having hydrolyzable groups that may be prepared include silanes having hydrocarbonoxy groups such as methoxy, ethoxy, butoxy, cyclohexyloxy, phenoxy; acyloxy groups such as acetoxy, benzoyloxy, propionyloxy; amino groups such as amino, dimethylamino; sulfide groups such as ethylthio and butylthio; and sulfonate groups such as C$_6$H$_5$SO$_3$—.

The fluoroaliphaticthiomethylsilanes where X in the general formula is a hydrolyzable group and n is 0-2 are useful for providing siloxane polymers having the structural unit,

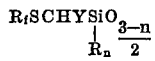

wherein $R_f$, R and Y are defined above and $n=0-2$. These siloxanes are provided by hydrolysis, cohydrolysis and/or condensation reactions of the above-described hydrolyzable silanes of the invention as more fully described in the copending U.S. application Ser. No. 346,992, filed concurrently with this application. Of particular importance is the hydrolysis of the silanes where n is 1 which produces linear siloxanes, having silanol (OH) end groups which can undergo additional condensation and elimination of water to afford the higher molecular weight siloxanes.

The siloxanes can also be prepared as copolymers by cohydrolysis of the above fluoroaliphaticthiomethylsilanes having OH or hydrolyzable X groups along with known silicon compounds of the formula $Z_mSiX_{4-m}$ in which X is defined above, m is 0 to 3 and Z can vary widely and can be hydrogen, hydroxy, or any monovalent hydrocarbon radical such as: alkyl radicals, for example, methyl, butyl, t-butyl, octadecyl; cycloaliphatic radicals for example cyclohexyl and cyclopentyl; aryl radicals for example phenyl, tolyl, xylyl and naphthyl; aralkyl radicals for example benzyl and gama-phenylbutyl; alkenyl radicals for example, vinyl, allyl, hexenyl, butadienyl, α-chlorovinyl or other unsaturated radicals such as butynyl. Z can also be a halohydrocarbon radical such as: chloromethyl, bromomethyl, 2 - chloroethyl, bromooctadecyl, chlorocyclohexyl, fluorophenyl, p-trifluoromethylphenyl, and 3, 3,3-trifluoropropyl. Z can also be a cyanohydrocarbon radical such as cyanomethyl, cyanoethyl or cyanopropyl or a carboxy containing radical such as 2-carboxyethyl or 4-carboxybutyl. Z can also be a divalent hydrocarbon radical such as methylene, tetramethylene, phenylene, naphthylene, cyclohexylene, cyclopentylene and the like, which would have two $SiX_{4-m}$ groups attached to Z.

The siloxanes range from low viscosity fluids useful as lubricants, surface-active agents, solvents, surface treating agents, and release agents to higher molecular weight polymers which are suitable for milling with fillers and catalysts and which can be crosslinked to provide molded articles having insolubility and low swell in hydrocarbon based solvents and oils, and which have flexibility at low temperatures. The siloxane polymers can be essentially homopolymers or copolymers having varying amounts of $R_fSCHY-$ pendant groups attached to silicon atoms. The polymers can for example contain a combination of siloxane units of the formula

where Z and m are defined above and the units

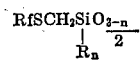

Chain extension or crosslinking of the siloxanes can be carried out by known methods such as described by Walter Noll in Chemistry and Technology of Silicones, 1968, pp. 386-430. For example high molecular siloxanes can be milled with suitable reinforcing filler, catalyst and other compatible additives and then heat vulcanized under pressure to form a molded article. Catalysts include organic peroxides such as dibenzoyl peroxide, bis(2,4-dichlorobenzoyl peroxide, di-tertiarylbutyl peroxide and the like, metal oxides such as zinc oxide and magnesium oxide and organic amines such as 1,1,3,3-tetramethylguanidine, triethylamine and 1,4-diazabicyclo[2.2.2]octane, and carboxylic acid salts such as tin octoate and dibutyltindilaurate.

The following examples provide a further illustration of the practice of the present invention. Temperatures are given in degrees centigrade and pressures are millimeters of mercury.

EXAMPLE 1

This example illustrates the preparation of the fluoroaliphaticthiomethylsilanes of the invention.

An anhydrous solution of 15 g. (0.12 mole) of dichlorodimethylsilane, 16 g. (0.12 mole) of perfluoromethylsulfenyl chloride and 35 ml. of methylene chloride was photolyzed at ambient temperature for four hours, using a 140 watt Hanovia ultraviolet lamp. A quartz flask fitted with a —78° condenser was used. Distillation gave 3.8 g. of methyl (perfluoromethylthiomethyl)dichlorosilane. $CF_3SCH_2Si(CH_3)Cl_2$, B.P. 94° C. at 200 mm.

EXAMPLE 2

The fluoroaliphaticthiomethylsilane may be converted to fluoroaliphaticthiomethylsiloxanes as follows:

Methyl(perfluoromethylthiomethyl)dichlorosilane (2.3 g.) was slowly added to 10 ml. of water with rapid stirring. The mixture was stirred for 1.5 hrs. and then extracted with methylene chloride. The dry extract was distilled to remove solvent and the residue heated at 75° C. in vacuo to obtain 1.2 g. of silanol oil consisting of

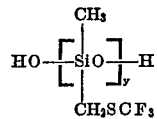

having a molecular weight of about 560 ($\overline{M}n$ in chloroform) and y having an average value of about 3.

EXAMPLE 3

Using procedures described in Example 1, 5.4 g. (0.05 mole) of trimethylchlorosilane, 6.8 g. (0.05 mole) of perfluoromethylsulfenyl chloride and 30 ml. of methylene chloride was photolyzed to yield 3.2 g. of dimethyl(perfluoromethylthiomethyl)chlorosilane, $$CF_3SCH_2Si(CH_3)_2Cl,$$

B.P. 85-88° C. at 150 mm. Cohydrolysis of this organosilane with the organosilane described in Example 1 following the described procedure gives a copolymer having the units,  and

EXAMPLE 4

Using procedures described in Example 1, a solution of 8.9 g. (0.1 mole) of tetramethylsilane, 13.7 g. (0.1 mole) of perfluoromethylsulfenyl chloride and 50 ml. of methylene chloride was photolyzed until a colorless solution resulted (2 hours). Distillation gave 7.4 g. of trimethyl(perfluoromethylthiomethyl)silane,

B.P. 114-116° C.

EXAMPLES 5-12

Other organosilanes of the invention prepared by procedures described in Example 1 are given in the following table. The $C_6H_5$ group refers to the phenyl group.

| Example | Reactants | Products | B.P., °C. |
|---|---|---|---|
| 5 | $CH_3Si(C_6H_5)Cl_2$ plus $CF_3SCl$ | $CF_3SCH_2Si(C_6H_5)Cl_2$ plus minor amount of— $(CF_3S)_2CHSi(C_6H_5)Cl_2$ | 45-48 (0.2mm.) |
| 6 | $ClCH_2Si(CH_3)Cl_2$ plus $CF_3SCl$ | $CF_3SCHClSi(CH_3)Cl_2$ plus minor amount of— $CF_3SCH_2Si(CH_2Cl)Cl_2$ | 97-101 (150 mm.) |
| 7 | $CF_3CH_2CH_2Si(CH_3)Cl_2$ plus $CF_3SCl$ | $CF_3SCHSi(CH_3)Cl_2$<br>    |<br>   $CH_2CF_3$ | 92-99 (90 mm.) |
| 8 | $(C_2H_5)_3SiCl$ plus $CF_3SCl$ | $CF_3SCH(CH_3)Si(C_2H_5)_2Cl$ | 105-107 (40 mm.) |
| 9 | $(CH_3)_2Si(C_6H_5)CH_2Cl$ plus $CF_3SCl$ | $CF_3SCH_2Si(C_6H_5)CH_2Cl$<br>    |<br>   $CH_3$ | 110-113 (4 mm.) |
| 10 | $(CH_3)_2SiCl_2$ plus $C_7F_{15}SCl$ | $C_7F_{15}SCH_2Si(CH_3)Cl_2$ | 71-74 (2 mm.) |
| 11 | $(CH_3)_3SiCl$ plus $C_7F_{15}SCl$ | $C_7F_{15}SCH_2Si(CH_3)_2Cl$ | 84-86 (4 mm.) |
| 12 | $(CH_3)_3SiCl$ plus $H(CF_2CF_2)_4SCl$ | $H(CF_2CF_2)_4SCH_2Si(CH_3)_2Cl$ | 100-102 (2 mm.) |

EXAMPLE 13

This example illustrates the conversion of a fluoroaliphaticthiomethylhalosilane to a hydrolyzable alkoxy silane.

Methyl (perfluoromethylthiomethyl) dichlorosilane (9 g.; 0.04 mole) was slowly added to 6.3 g. (0.137 mole) of anhydrous ethanol at room temperature using a nitrogen purge to remove HCl evolved. The mixture was then stirred at 50° C. for one hour. Distillation gave 6.5 g. of methyl(perfluoromethylthiomethyl)diethoxysilane, $$CF_3SCH_2Si(CH_3)(OC_2H_5)_2$$

B.P. 82-83° (30 mm.).

Silanes of the invention wherein Y is chloromethyl may also be prepared by the addition of a perfluoroaliphaticsulfenyl chloride to a vinyl silane having the structural formula

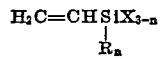

wherein R and X are defined above.

An example illustrating this alternative method of preparation is:

EXAMPLE 14

To a mixture of 10.8 g. (0.07 mole) of vinyldiethoxymethylsilane and 50 ml. of methylene chloride was added 9.2 g. (0.07 mole) of $CF_3SCl$ (exothermic). The mixture was stirred at 25° C. for 20 hours and distilled to yield 8.6 g. of a product having a boiling point of 114-115° (30 mm.). The product analyzed as follows:

Found: 32.4% C; 12.0% Cl; 19.0% F. Calculated: 32.4% C; 12.0% Cl; 19.2% F

The structure is believed to be

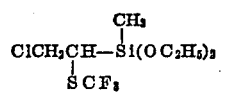

The previous examples have specifically exemplified most of the materials encompassed by this invention. This can readily be seen from the following table which shows the groups X, Y, R, and $R_f$.

| Example | Y | X | $R_f$ | R |
|---|---|---|---|---|
| 1 | H | Cl | $CF_3$ | $CH_3$ |
| 3 | H | Cl | $CF_3$ | $CH_3$ |
| 4 | H | | $CF_3$ | $CH_3$ |
| 5 | H or $CF_3S$ | Cl | $CF_3$ | $C_6H_5$ |
| 6 | {Cl, H} | Cl | $CF_3$ | $CH_3$, $CH_2Cl$ |
| 7 | $CF_3CH_2$ | Cl | $CF_3$ | $CH_3$ |
| 8 | $CH_3$ | Cl | $CF_3$ | $C_2H_5$ |
| 9 | H | | $CF_3$ | $C_6H_5$, $CH_3$, $CH_2Cl$ |
| 10 | H | Cl | $C_7H_{15}$ | $CH_3$ |
| 11 | H | Cl | $C_7F_{15}$ | $CH_3$ |
| 12 | H | Cl | $C_8F_{16}H$ | $CH_3$ |
| 13 | H | $OC_2H_5$ | $CF_3$ | $CH_3$ |
| 14 | $CH_2Cl$ | $OC_2H_5$ | $CF_3$ | $CH_3$ |

All of the silanes encompassed by this disclosure and not specifically exemplified, may be produced by the methods and techniques generally disclosed herein.

I claim:

1. An organosilane comprising a material of the formula

wherein $R_f$ is a highly fluorinated monovalent fluoroaliphatic radical having 1 to 18 carbon atoms said radical containing not more than one divalent oxygen atom or one trivalent nitrogen for every two carbon atoms in the skeletal chain and not more than one hydrogen or chlorine atom per carbon atom in the chain, the remaining atoms bonded to carbon being fluorine;

R is selected from methyl, ethyl and phenyl;

Y is selected from hydrogen, chlorine, methyl, chloromethyl, phenyl, $R_fS$ and $R_fCH_2$;

X is a hydrolyzable group; and n is 0–3.

2. The organosilane of claim 1 wherein X is chlorine and Y is selected from hydrogen, chlorine and methyl.

3. The organosilane of claim 1 wherein $R_f$ is perfluoroalkyl.

4. The organosilane of claim 2 wherein $R_f$ is perfluoroalkyl.

5. The organosilane of claim 1 wherein Y is hydrogen.

6. The organosilane of claim 4 wherein Y is hydrogen.

7. The organosilane of claim 3 wherein X is chlorine, R is methyl, Y is hydrogen, and n is 0–2.

8. The organosilane of claim 3 wherein R is methyl, Y is hydrogen and $n$ is 3.

9. A method of preparing a fluoroaliphaticthiomethylsilane which comprises the free radical substitution reaction of a fluoroaliphaticsulfenyl chloride with a methylsilane according to the following reaction:

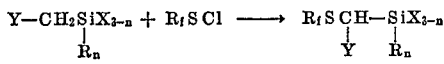

wherein $R_f$ is a highly fluorinated monovalent fluoroaliphatic radical having 1 to 18 carbon atoms said radical containing not more than one divalent oxygen atom or one trivalent nitrogen for every two carbon atoms in the skeletal chain and not more than one hydrogen or chlorine atom per carbon atom in the chain, the remaining atoms bonded to carbon being fluorine;

R is selected from methyl, ethyl, and phenyl;

Y is selected from hydrogen, chlorine, methyl, chloromethyl, phenyl $R_fS$ and $R_fCH_2$;

X is a chlorine, bromine or fluorine; and $n$ is 0-3.

10. The method of claim 9 wherein X is chlorine and Y is selected from hydrogen, chlorine, and methyl.

11. The method of claim 9 wherein $R_f$ is perfluoroalkyl.

12. The method of claim 10 wherein $R_f$ is perfluoroalkyl.

13. The method of claim 9 wherein Y is hydrogen.

14. The method of claim 12 wherein Y is hydrogen.

15. The method of claim 9 wherein X is chlorine, R is methyl, Y is hydrogen and $n$ is 0-2.

16. The method of claim 9 wherein R is methyl, Y is hydrogen and $n$ is 3.

References Cited

UNITED STATES PATENTS

| 3,255,140 | 6/1966 | Sinn et al. | 260—448.2 N X |
| 3,532,733 | 10/1970 | Lee | 260—448.8 R |
| 3,478,076 | 11/1969 | Kim et al. | 260—448.2 N |
| 2,544,296 | 3/1951 | Burkhard | 260—448.2 N |

DANIEL E. WYMAN, Primary Examiner

P. F. SHAVER, Assistant Examiner

U.S. Cl. X.R.

106—38.22; 252—49.6, 351, 364; 260—116.5 E, 448.2 E, 448.8 R